Patented Mar. 12, 1940

2,193,751

UNITED STATES PATENT OFFICE 2,193,751

DYESTUFF MIXTURES AND PROCESS FOR PRODUCING FAST GRAY AND BLACK PRINTS

Hans Wenk and Fritz Grieshaber, Riehen, Switzerland, assignors to Society of Chemical Industry in Basle, Basel, Switzerland No Drawing. Application June 21, 1938, Serial No. 215,060. In Switzerland June 22, 1937

12 Claims. (Cl. 8—28)

This invention is based on the observation that valuable gray to black prints may be obtained by printing with dyestuff mixtures containing dyestuffs which dye blue to violet belonging to the benzanthrone series together with indigoid dyestuffs of the general formula

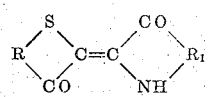

wherein R is a naphthalene radical united with the sulfur atom in 1-position and with a carbonyl group in 2-position and $R_1$ is a benzene radical.

Dyestuffs of the benzanthrone series which dye blue to violet are, for instance, those of the dibenzanthrone, the isodibenzanthrone and the benzanthronepyrazolanthrone series. The indigoid dyestuffs of the above general formula may be obtained, for example, by condensing 1:2-naphththioindoxyl which may be substituted by halogen, for example chlorine or bromine, or its 2'-carboxylic acid with a reactive 2'-derivative of isatin which may be substituted. Substituents are for example halogens, such as chlorine and bromine, alkyl groups such as methyl groups and alkoxy groups, for instance methoxy and ethoxy groups.

Especially valuable are those dyestuff mixtures which contain dyestuffs of the dibenzanthrone series as well as indigoid dyestuffs of the general formula

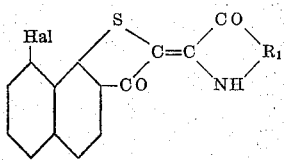

in which $R_1$ is a halogenated benzene radical; and of these mixtures those give the best results which contain the dyestuff dibenzanthrone and the indigoid dyestuff of the formula

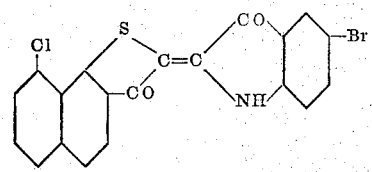

obtainable by condensation of 8-chloro-1:2-naphththioindoxyl with 5-bromisatin-α-chloride.

Besides the foregoing dyestuffs the dyestuff mixtures may contain the usual orange, brown and yellow dyeing dyestuffs for black toning; these dyestuffs may be of the anthraquinoid series, for instance flavanthrene, dibenzpyrenequinone, pyranthrone and anthanthrones or of the indigoid series. Suitable dyestuffs are, for instance flavanthrene, pyranthrone, the orange dyeing condensation product from 1 mol of 1:4:5:8-naphthalene-tetracarboxylic acid and 2 mol ortho-phenylenediamine, 2:1:2':1'-naphththioindigo and the condensation product from 8-chloro-1:2-naphththioindoxyl with the 2-(para-dimethylaminoanil) of 2:1-naphththioindoxyl.

The dyestuff mixtures, which may contain the individual dyestuffs in various proportions, may be made in any desired manner, for example by mixing with dyestuff powders and converting the mixture into paste or by mixing pastes of the dyestuffs, or the individual dyestuffs may be added to the printing paste. These dyestuff powders or pastes may contain the dyestuffs in non-reduced or reduced condition, for example in the form of leuco-esters. Furthermore, they may contain various additions suitable for printing, for example a phenol such as crude cresol, a water-soluble alcohol, for instance glycerine, ethylene glycol, thiodiglycol, also hydrotropic agents, for instance para-toluenesulfonic acid, cymene-sulfonic acid, urea, sulfite cellulose liquor, benzylanilinesulfonic acid, aliphatic or hydroaromatic acids of high molecular weight or salts thereof which contain at least 8 carbon atoms together with organic bases, wetting agents, emulsifying agents, reduction catalysts, for instance alkali-2:6-anthraquinone-disulfonates, anthraquinone, hydroxyanthraquinone and salts thereof, also heavy metal salts, for instance ferrous sulfate, filling agents, for instance dextrin, starch or sugar, reducing agents, for instance sodium hydrosulfite and finally alkalies, for instance caustic potash, caustic soda, ammonium hydroxide, sodium carbonate, magnesium hydroxide or potassium carbonate.

The dyestuff mixtures may be used in all kinds of textile printing; they are characterized by rapid fixing and may be developed by merely washing with water; they yield, for example on cellulosic fibers such as cotton, artificial silk from regenerated cellulose, very fast, full, black prints.

The following examples illustrate the invention, the parts being by weight:

*Example 1*

120 parts of a mixture consisting of 45 parts of the dyestuff from 8-chloro-1:2-naphththioindoxyl and 5-bromisatin-α-chloride in the form of paste of 40 per cent strength (made by grinding the powder with water and 10 per cent of glycerine),
    30 parts of dibenzanthrone paste containing 7.7 parts of dibenzanthrone,
    10 parts of 2:1:2′:1′-naphththioindigo paste, containing 1.64 parts of 2:1:2′:1′-naphththioindigo,
    15 parts of flavanthrene paste, containing 2.5 parts of flavanthrene, are stirred with 700 parts of a thickening consisting of 110 parts of wheat starch
    170 parts of water,
    250 parts of tragacanth mucilage (60 parts in 1000 parts of water)
    200 parts of British gum powder
    170 parts of potassium carbonate
    100 parts of glycerine 1000 parts, which thickening has been boiled for half-an-hour, and
100 parts of hydrosulfite R conc. There are then added
  50 parts of sodium benzylsulfanilate and
  30 parts of water 1000 parts The goods, for instance cotton, are printed with the mixture after it has stood for 2 hours and then steamed in a Mather Platt apparatus for 5 minutes; developing for 1 minute by washing with water and soaping, and drying follow. The cotton is printed fast black shades.

*Example 2*

18 parts of the dyestuff from 8-chloro-1:2-naphththioindoxyl and 5-bromisatin-chloride,
  28 parts of dibenzanthrone paste containing 7.2 parts of dibenzanthrone,
  15 parts of flavanthrene paste containing 2.5 parts of flavanthrene,
  12 parts of 2:1:2′:1′-naphththioindigo, containing 1.96 parts of 2:1:2′:1′-naphththioindigo,
  10 parts of glycerine,
  40 parts of sodium benzene sulfonate and a dispersing agent, for instance 2 parts of sulfite cellulose liquor, are ground together in a mill, for instance a cylindrical ball mill, until a homogeneous paste is obtained. This paste is concentrated to 100 parts, for instance on the water bath, and again ground and sifted for homogenising it.

Goods which have been printed with 120 parts of this paste per 1000 parts in the manner described in Example 1 have a fast, full black pattern.

*Example 3*

45 parts of the dyestuff from 8-chloro-1:2-naphththioindoxyl and 5-bromisatin-α-chloride,
  75 parts of dibenzanthrone paste, containing 19.3 parts of dibenzanthrone,
  37.5 parts of flavanthrene paste, containing 6.25 parts of flavanthrene,
  25 parts of 2:1:2′:1′-naphththioindigo paste, containing 4.10 parts of 2:1:2′:1′-naphththioindigo, are thoroughly ground with
  70 parts of dextrin,
100 parts of sodium cymene sulfonate and about
300 parts of water in a ball mill; the mixture is dried in a suitable manner, for instance in a dust drier, and then finely ground. When used for printing in the manner described in Example 1, this dyestuff preparation yields fast, beautiful black prints.

*Example 4*

25 parts of the dyestuff from 1:2-naphththioindoxyl and isatin-α-chloride,
  30 parts of dibenzanthrone paste, containing 7.6 parts of dibenzanthrone,
  15 parts of flavanthrene paste, containing 2.5 parts of flavanthrene,
  15 parts of 2:1:2′:1′-naphththioindigo paste, containing 2.42 parts of 2:1:2′:1′-naphththioindigo,
  10 parts of glycerine,
  20 parts of sodium cymene sulfonate,
   5 parts of sodium benzyl sulfanilate and
   2 parts of sulfite cellulose liquor are ground together in a cylindrical ball mill. The homogeneous paste thus obtained is concentrated to 100 parts on the water bath and, if desired, again ground.

When applied to goods in the proportion of 120 parts per kilo in the manner described in Example 1, this paste yields deep, fast black shades.

*Example 5*

120 parts of a mixture obtained by grinding together and subsequently evaporating to 100 parts,
  50 parts of the dyestuff from 8-bromo-1:2-naphththioindoxyl and 5-bromisatin-chloride in the form of a paste of 40 per cent strength (made by grinding the powder with water and 10 per cent of glycerine),
  28 parts of dibenzanthrone paste, containing 7.2 parts of dibenzanthrone,
  15 parts of flavanthrene paste, containing 2.5 parts of flavanthrene,
  12 parts of 2:1:2′:1′-naphththioindigo paste, containing 1.96 parts of 2:1:2′:1′-naphththioindigo are stirred as described in Example 1, with
700 parts of the same thickening and
100 parts of hydrosulfite R conc. and then
  80 parts of urea are mixed therewith.

The goods printed with this product exhibit a beautiful fast black.

When the proportion is 100 parts of the printing paste to 1000 parts of thickening, the print obtained is a fast gray.

*Example 6*

100 parts of a mixture consisting of 45 parts of the dyestuff from 8-chloro-1:2-naphththioindoxyl and 5-bromisatinchloride in the form of paste of 50 per cent strength (made by grinding the powder with water and glycerine), 25 parts of dibenzanthrone paste, containing 6.4 parts of dibenzanthrone, 15 parts of a bromodibenzpyrenequinone paste, made as described in German Specification No. 566,796 and containing 3 parts of bromodibenzpyrenequinone, 15 parts of 2:1:2′:1′-naphththioindigo paste, containing 2.42 parts of 2 : 1 : 2 ′ : 1 ′ - naphththioindigo, are stirred with 700 parts of a thickening, for instance that described in Example 1, 100 parts of hydrosulfite R conc.

80 parts of urea and 20 parts of water thoroughly mixed

————

1000 parts

Using this thickening the mixture produces on cotton black prints having the advantages stated in the introduction to this specification.

*Example 7*

If in Example 6 there is substituted for the dyestuff of German Specification No. 566,796 15 parts of pyranthrone paste, containing 2.89 parts of pyranthrone, and the printing paste is prepared as follows:

110 parts of the dyestuff paste mixture 700 parts of the thickening prescribed in Example 1

100 parts of hydrosulfite R conc.

80 parts of urea 10 parts of water

————

1000 parts there is obtained by following the mode of operation described above a fast black print.

*Example 8*

If in Example 6 instead of the dyestuff described in German Specification No. 566,796 there are used 15 parts of the dyestuff of German Specification No. 458,598, Example 1 or 2, in the form of a paste, containing 2.5 parts of dichloranthanthrone, and the procedure is otherwise similar to that prescribed in Example 7 of this specification, there are obtained deep, fast black prints.

What we claim is:

1. Process for producing fast gray and black prints, which comprises printing cellulosic fibers with dyestuffs of the benzanthrone series dyeing blue to violet in conjunction with indigoid dyestuffs of the general formula

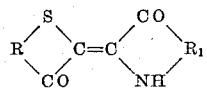

wherein R is a naphthalene radical united with the sulfur atom in 1-position and with the carbonyl group in 2-position, and $R_1$ is a benzene radical.

2. Process for producing fast gray to black prints, which comprises printing cellulosic fibers with dibenzanthrone in conjunction with indigoid dyestuffs of the general formula

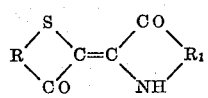

wherein R is a naphthene radical united with the sulfur atom in 1-position and with the carbonyl group in 2-position, and $R_1$ is a benzene radical.

3. Process for producing fast gray to black prints, which comprises printing cellulosic fibers with dibenzanthrone in conjunction with indigoid dyestuffs of the general formula

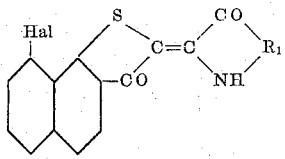

wherein $R_1$ is a benzene radical.

4. Process for producing fast gray to black prints, which comprises printing cellulosic fibers with dibenzanthrone in conjunction with indigoid dyestuffs of the general formula

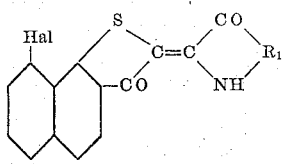

wherein $R_1$ is a halogenated benzene radical.

5. Process for producing fast gray to black prints, which comprises printing cellulosic fibers with dibenzanthrone in conjunction with indigoid dyestuffs of the formula

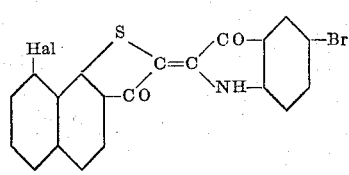

6. Process for producing fast gray to black prints, which comprises printing cellulosic fibers with dibenzanthrone in conjunction with indigoid dyestuffs of the formula

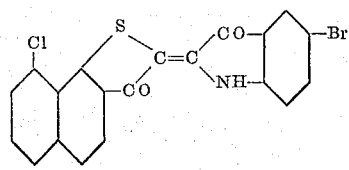

7. Dyestuff mixtures which print cellulosic fibers fast gray to black tints, containing dyestuffs of the benzanthrone series dyeing blue to violet in conjunction with indigoid dyestuffs of the general formula

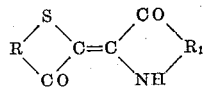

wherein R is a naphthalene radical united with the sulfur atom in 1-position and with the carbonyl group in 2-position, and $R_1$ is a benzene radical.

8. Dyestuff mixtures which print cellulosic fibers fast gray to black tints, containing dibenzanthrone in conjunction with indigoid dyestuffs of the general formula

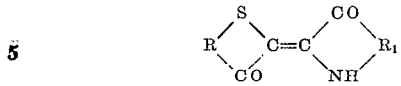

wherein R is a naphthalene radical united with the sulfur atom in 1-position and with the carbonyl group in 2-position, and $R_1$ is a benzene radical.

9. Dyestuff mixtures which print cellulosic fibers fast gray to black tints, containing dibenzanthrone in conjunction with indigoid dyestuffs of the general formula

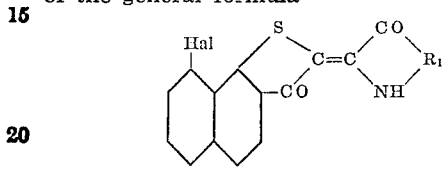

wherein $R_1$ is a benzene radical.

10. Dyestuff mixtures which print cellulosic fibers fast gray to black tints, containing dibenzanthrone in conjunction with indigoid dyestuffs of the general formula

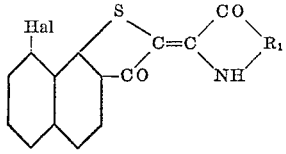

wherein $R_1$ is a halogenated benzene radical.

11. Dyestuff mixtures which print cellulosic fibers fast gray to black tints, containing dibenzanthrone in conjunction with indigoid dyestuffs of the formula

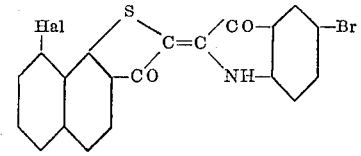

12. Dyestuff mixtures which print cellulosic fibers fast gray to black tints, containing dibenzanthrone in conjunction with the indigoid dyestuff of the formula

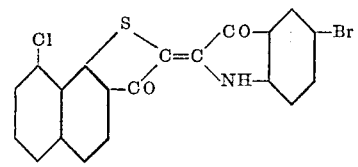

HANS WENK.
FRITZ GRIESHABER.